United States Patent
Legros et al.

(10) Patent No.: US 7,272,722 B2
(45) Date of Patent: Sep. 18, 2007

(54) METHOD FOR INDUSTRIALLY CHANGING THE PASSWORDS OF AIX/UNIX USERS

(75) Inventors: Claude Legros, Gattieres (FR); Michel Melot, Saint Jeannet (FR); Nicole Szczap, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 818 days.

(21) Appl. No.: 10/287,348

(22) Filed: Nov. 4, 2002

(65) Prior Publication Data
US 2003/0101360 A1    May 29, 2003

(30) Foreign Application Priority Data
Nov. 23, 2001   (EP)   .................................... 1480119

(51) Int. Cl.
H04K 1/00    (2006.01)
H04L 9/00    (2006.01)
G06F 7/04    (2006.01)
G06F 7/58    (2006.01)
G06F 15/16   (2006.01)
G06F 17/30   (2006.01)

(52) U.S. Cl. ........................... 713/183; 713/155; 726/5
(58) Field of Classification Search ................ 713/183; 726/3
See application file for complete search history.

(56) References Cited

U.S. PATENT DOCUMENTS 5,351,295 A * 9/1994 Perlman et al. ............. 713/162
5,719,941 A * 2/1998 Swift et al. .................. 713/155
5,826,016 A   10/1998 Ito et al. .................. 395/188.01
6,118,873 A * 9/2000 Lotspiech et al. ........... 380/277
6,681,386 B1 * 1/2004 Amin et al. ................. 717/136
6,871,286 B1 * 3/2005 Cagle et al. .................... 726/5
2002/0078386 A1* 6/2002 Bones et al. ................. 713/202

FOREIGN PATENT DOCUMENTS

EP     0884 877 A1    12/1998

OTHER PUBLICATIONS

Belgers, Walter. "UNIX Password Security." Dec. 6, 1993. Accessed on Apr. 24, 2006. www.ja.net/CERT/Belgers/UNIX-password-security.html. pp. 1-7.*

* cited by examiner

Primary Examiner—David Y. Jung
Assistant Examiner—Jason K. Gee
(74) Attorney, Agent, or Firm—Scully, Scott, Murphy & Presser, P.C.; David L. Adour, Esq.

(57) ABSTRACT

A method for industrially changing the passwords of users in an AIX/UNIX system including a plurality of stations. A system being managed by a system administrator located at one of the stations is able to change the passwords of at least a set of users. The method comprises the steps of building an initial program including a new password selected by the system administrator for replacing the current password of all users, compiling the initial program in order to obtain an executable program, transmitting the executable program to the stations, and executing in each station, the executable program in order to obtain an encrypted string corresponding to the new password, the encrypted string being specific to the stations wherein the executable program is executed.

8 Claims, 2 Drawing Sheets

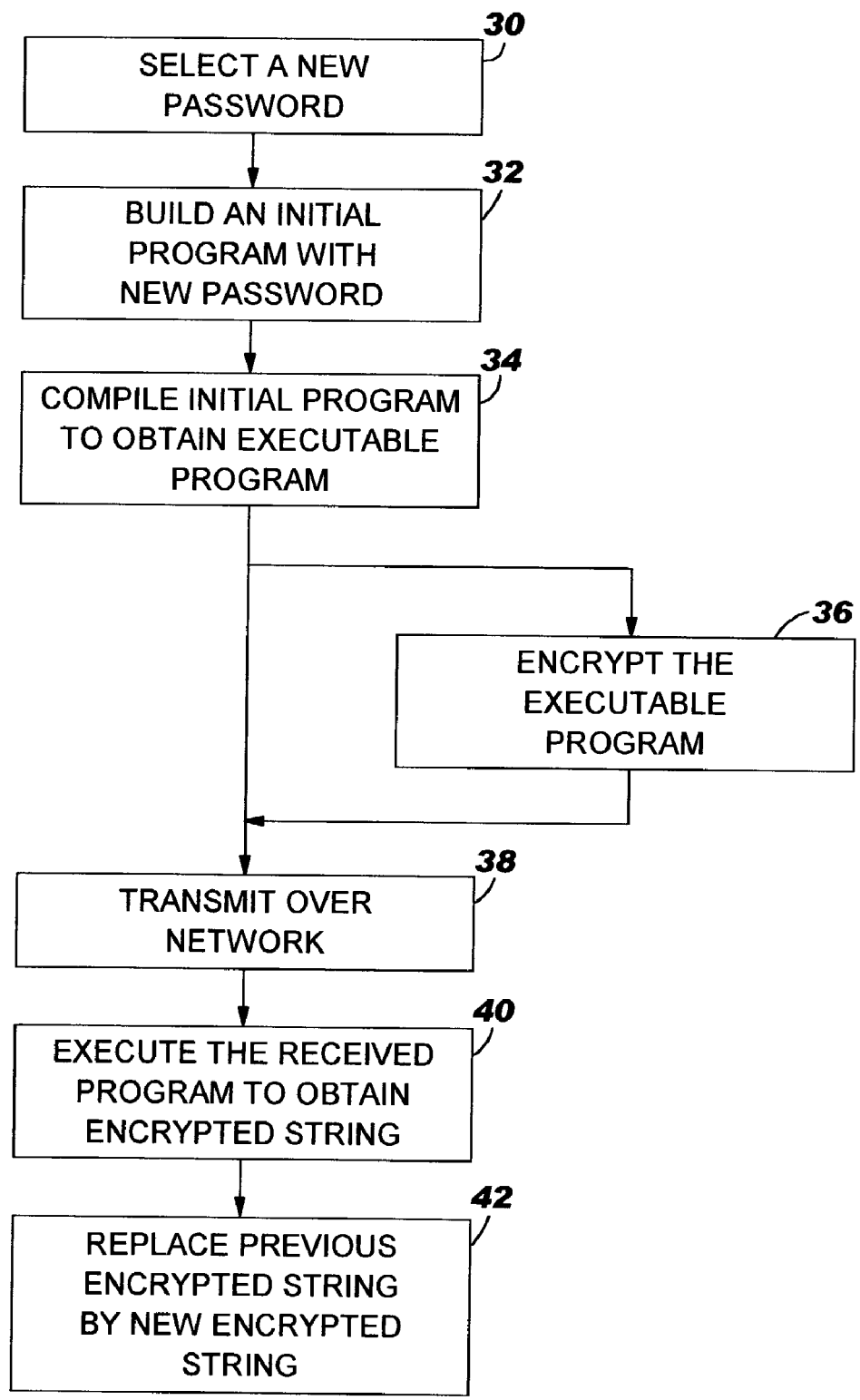

METHOD FOR INDUSTRIALLY CHANGING THE PASSWORDS OF AIX/UNIX USERS

FIELD OF THE INVENTION

The present invention relates to the management of users of AIX/UNIX stations and relates in particular to a method initialized by the system administrator for industrially changing the passwords of the AIX/UNIX users.

BACKGROUND

In an AIX/UNIX system, security is based on rights to access files and commands. Some of these files and commands are more protected than others, especially if they are very sensitive because they can corrupt the system, resulting in a loss of data for the users and applications.

Accordingly, any user has two forms of identification: a user name and a user ID. This enables a user to access some files and commands and to have limited rights such as "read", "write" or "execute" applied to a file or a command, associated with the user ID. In addition to the user name and the user ID, each user has a password which is required to enter a file or a command to which he may access.

In an AIX/UNIX system, there is a super user, also named the "root", who is the system administrator. He is associated with the user ID=0, which provides him with all system administrator functions. As any other user, the system administrator has a password which is disclosed with considerable care by providing "roles" which are authorizations that allow a user to execute functions normally executed by the "root" user.

It is said that the security of the system is no better than the weakest password, because once person has access to a user's account, it is possible for this person to exploit weaknesses in the system configuration and gain access to the root's account or mount a denial of service attack from the system.

There is a normal UNIX command to change a password. This command may be used by any user to change its own password or by the system administrator ("root") to change any user's password. It is usually convenient for the system administrator to set an initial password for a new user in order to activate the new user's account. In such a case, the system administrator has to set up a connection (Telnet) to the station where is the user, and then he is prompted to enter a new password only known by himself.

Periodically, or when the system has been hacked, the security requires password changes for all the stations of the system. As mentionned above, changing a password implies a network connection for each password. During this connection, the system administrator must log as root user, enter the password command and then enter the new password twice for checking. The problem is that changing the passwords is a vast undertaking for the system administrator when there are several hundred AIX/UNIX users.

SUMMARY

Accordingly, an object of the invention is to provide a method for industrially changing the passwords of the users in a AIX/UNIX system without requiring set up of a connection and entry of a password command for each user.

The invention relates therefore to a method for industrially changing the passwords of users in an AIX/UNIX system including a plurality of stations, each station having at least one user, the system being managed by a system adminsitrator located at one of said stations and being able to change the passwords of at least a set of users. The method comprises the steps of building an initial program including a new password selected by the system administrator for replacing the current password of all users in the set of users, compiling the initial program containing the new password in order to obtain an executable program, transmitting the executable program to the stations, and executing in each station, the executable program in order to obtain an encrypted string corresponding to the new password, the encrypted string being specific to the stations wherein the executable program is executed.

BRIEF DESCRIPTION OF THE DRAWINGS

The above and other objects, features and advantages of the invention will be better understood by reading the following more particular description of the invention in conjunction with the accompanying drawings wherein:

FIG. 2 is a flow chart representing the steps of the method according to the invention.

DETAILED DESCRIPTION

Figure 1:
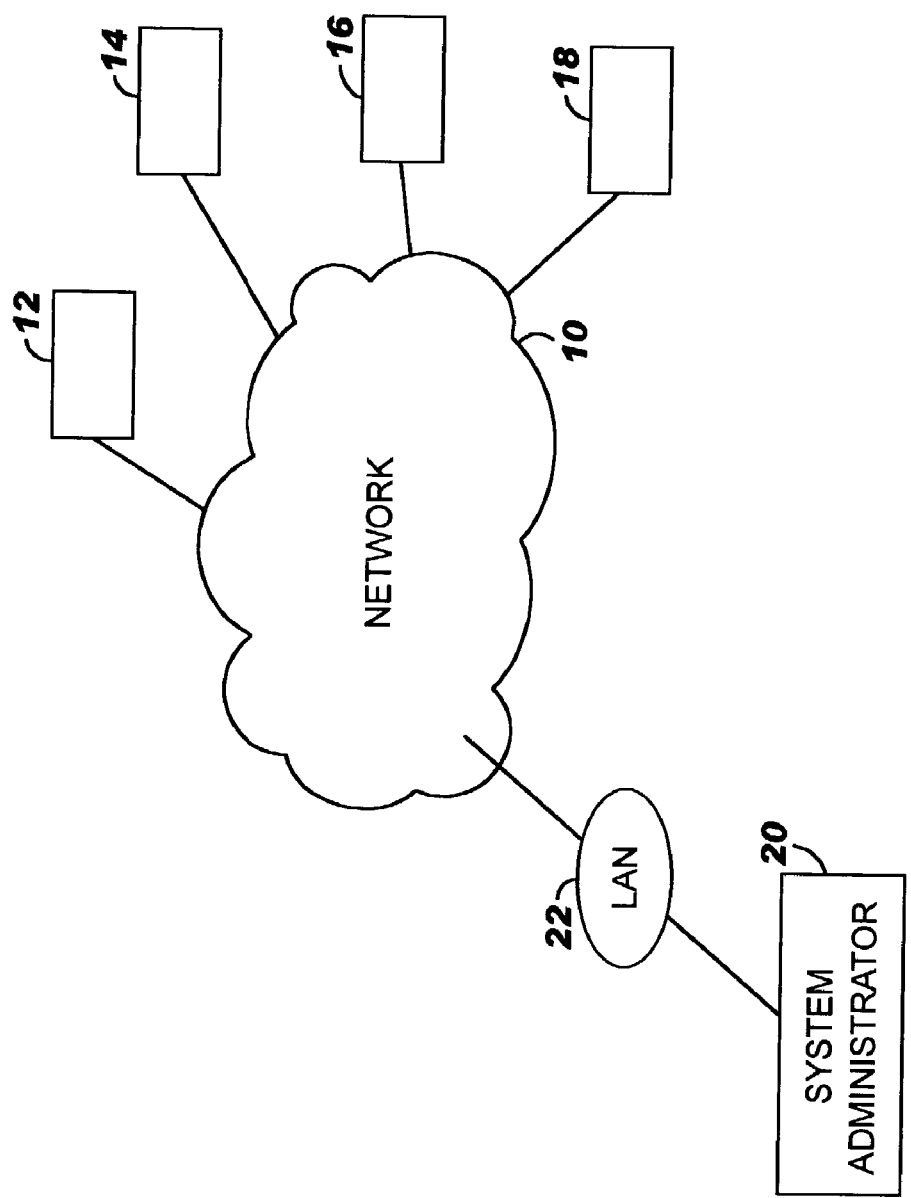
FIG. 1 is a schematic block-diagram representing an AIX/UNIX system wherein the method according to the invention can be implemented.

Referring to FIG. 1, an AIX/UNIX system wherein the invention can be implemented includes an Intranet network or the Internet network 10 to which are connected a plurality of stations 12, 14, 16, 18 and 20. Each of these stations includes one or several users. A system administrator in charge of managing and acting as the "root" (user ID=0) is in one the system stations, for example station 20. In the figure, the station 20 is connected to network 10 by means of a LAN 22, but it is clear than any one of the other stations 12, 14, 16 or 18 could also be connected to the network by means of a LAN. Note also that the system administrator could be in any one of the stations in the system.

Referring to FIG. 2, the method according to the invention consists first in selecting a new password by the system administrator at station 20 (step 30). Note that this password will be the same for all users, but this is not a disadvantage insofar as it is advisable for any user to enter a personal password once the password has been changed by the system administrator.

Then, an initial program is built (step 32), preferably in C language. Such a program includes a password file containing the password selected by the system administrator and a password routine which will enable the stations to encrypt the password. When the initial program has been built, it is compiled (step 34) to be transformed into an executable program which is in the form of a binary file.

Then, the executable program is transmitted to all the stations over the network (step 38), either directly if the network is a private network, or after being encrypted if the network is the Internet network (step 36). When received by a station, the executable program is executed (step 40) and the password contained in the password file is industrially encrypted (step 42) by using the password routine also contained in the password file. Note that the encryption is performed by using an encryption key which is specific to the station so that the password is transformed, in each station, into an encrypted string different for each station which is written in the password file where AIX/UNIX encrypted passwords are usually written. During the same time, the "last change date" is updated to the current date allowing the system to take the new password into account and to manage it according to the security rules set in the system.

The invention claimed is:

1. A method for changing the passwords in a computer system including a plurality of stations, each station having at least one user, said system being managed by a system administrator located at one of said stations and being able to change the passwords of at least a set of users amongst said users, said method comprising the steps of:

building an initial program including a new, common password selected by said system administrator for replacing a plurality of current passwords of a plurality of users in said set of users;

compiling said initial program in order to obtain an executable program including said new, common password;

transmitting said executable program to said plurality of stations; and executing said executable program in each of said plurality of stations to obtain a plurality of encrypted strings from said new, common password, including the step of each of said plurality of stations encrypting the new, common password to obtain from the new password a unique, respective one of said plurality of encrypted strings to replace the current password of the at least one user of said each of said plurality of stations.

2. The method according to claim 1, wherein said initial program includes a password file containing said selected password and a password routine to be used by each of said stations for which the passwords are to be changed in order to obtain said encrypted string.

3. A method according to claim 1, wherein the plurality of stations are provided with encryption keys, and each of said plurality of stations is provided with a respective, unique one of said encryption keys, and the executing step includes the step of said each of said plurality of stations using the unique encryption key provided to said each station, to obtain from the new password the respective, unique one of the encryption strings for the said each station.

4. A method according to claim 3, wherein the transmitting step includes the step of transmitting said executable program, including said new, common password, from the system administrator to each of said plurality of stations.

5. The method according to claim 3, wherein said encrypted string is written in a password file.

6. The method according to claim 1, wherein said stations are connected to a network.

7. The method according to claim 6, wherein said network is the Internet network.

8. The method according to claim 7, further comprising the step of encrypting said executable program before transmitting said executable program over said Internet network to said stations.

* * * * *